Figure 4:
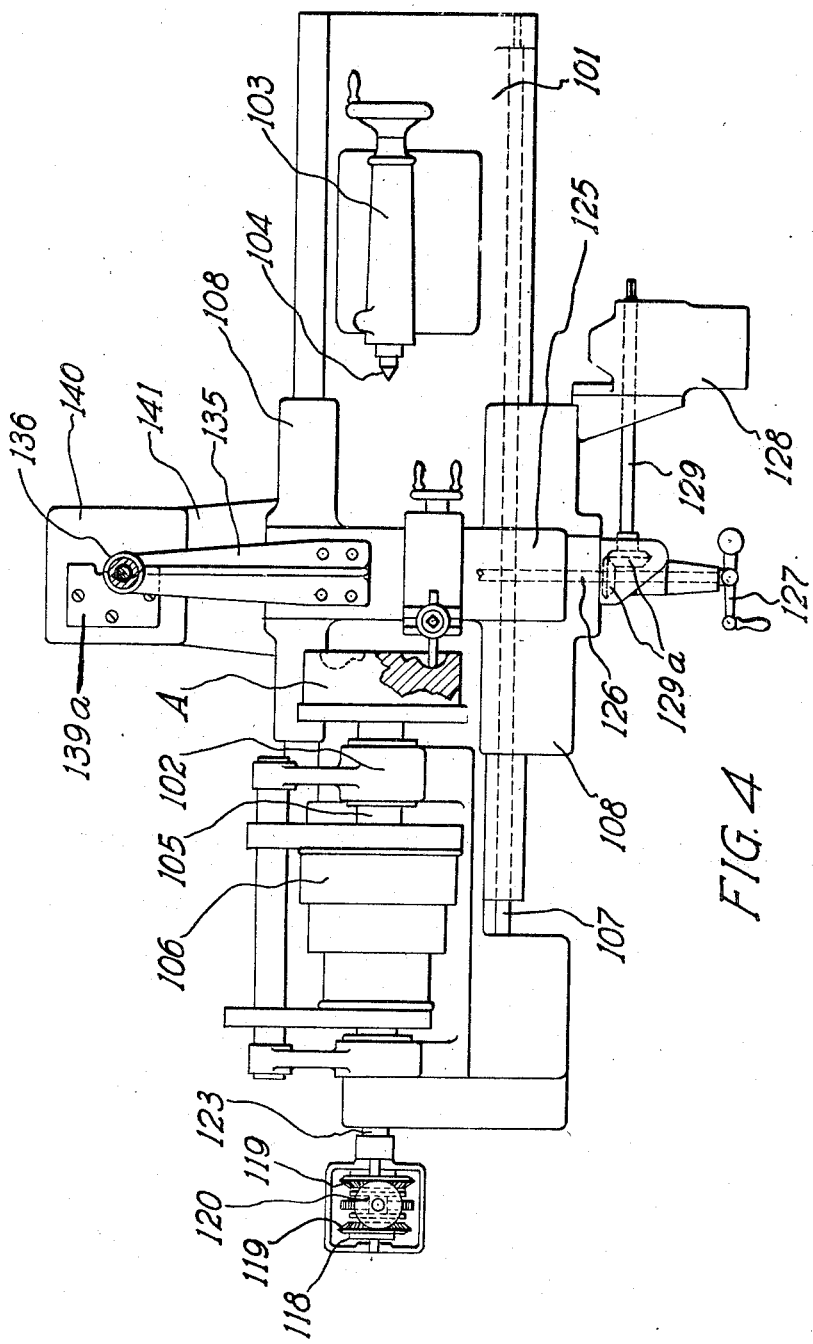

Aug. 5, 1930. J. C. SHAW ET AL 1,772,431
ELECTRIC TRACER CONTROL FOR LATHES
Filed July 25, 1928 3 Sheets-Sheet 1
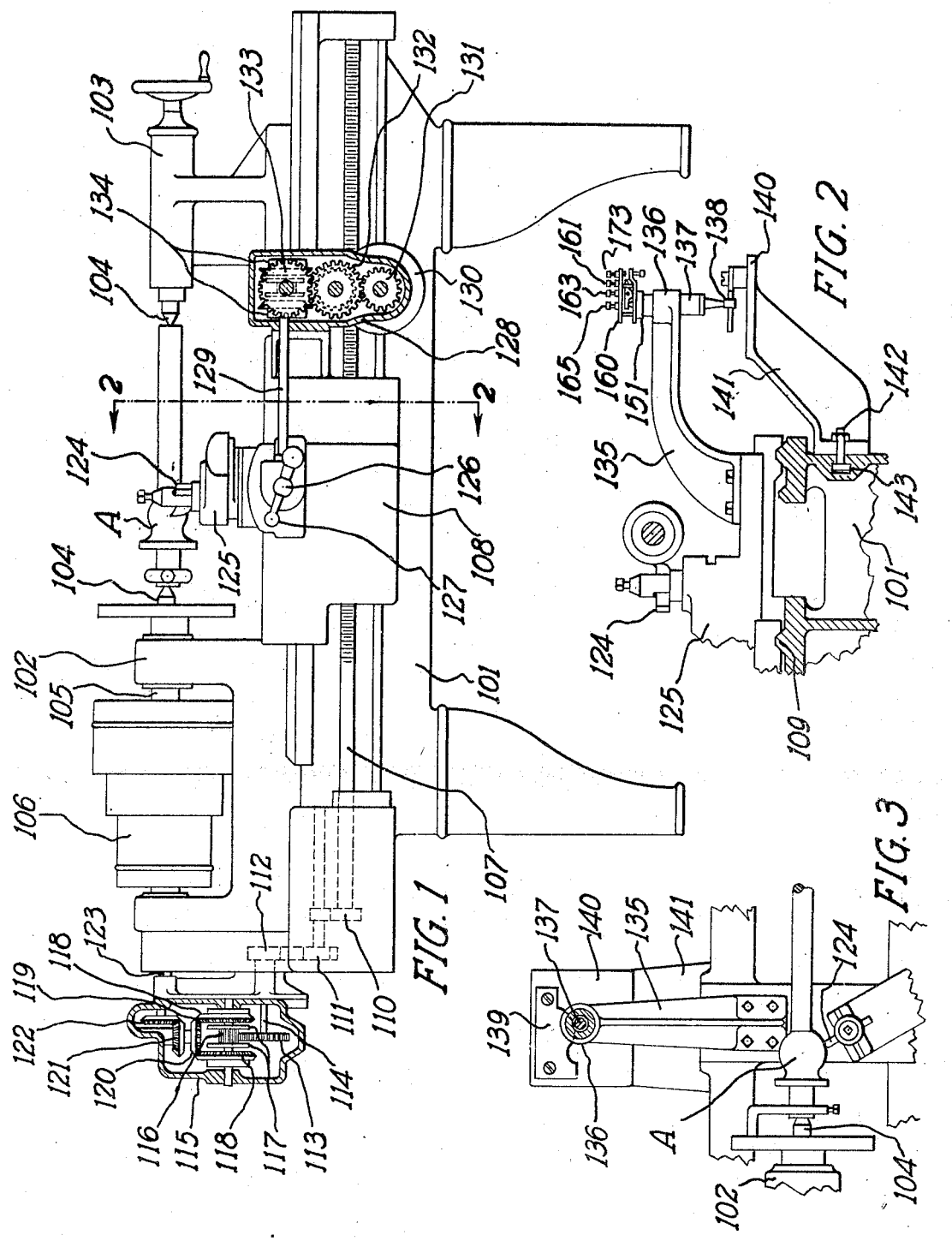
INVENTOR
John C. Shaw and
BY Robert D. Shaw
N. H. Lockwood
ATTORNEY

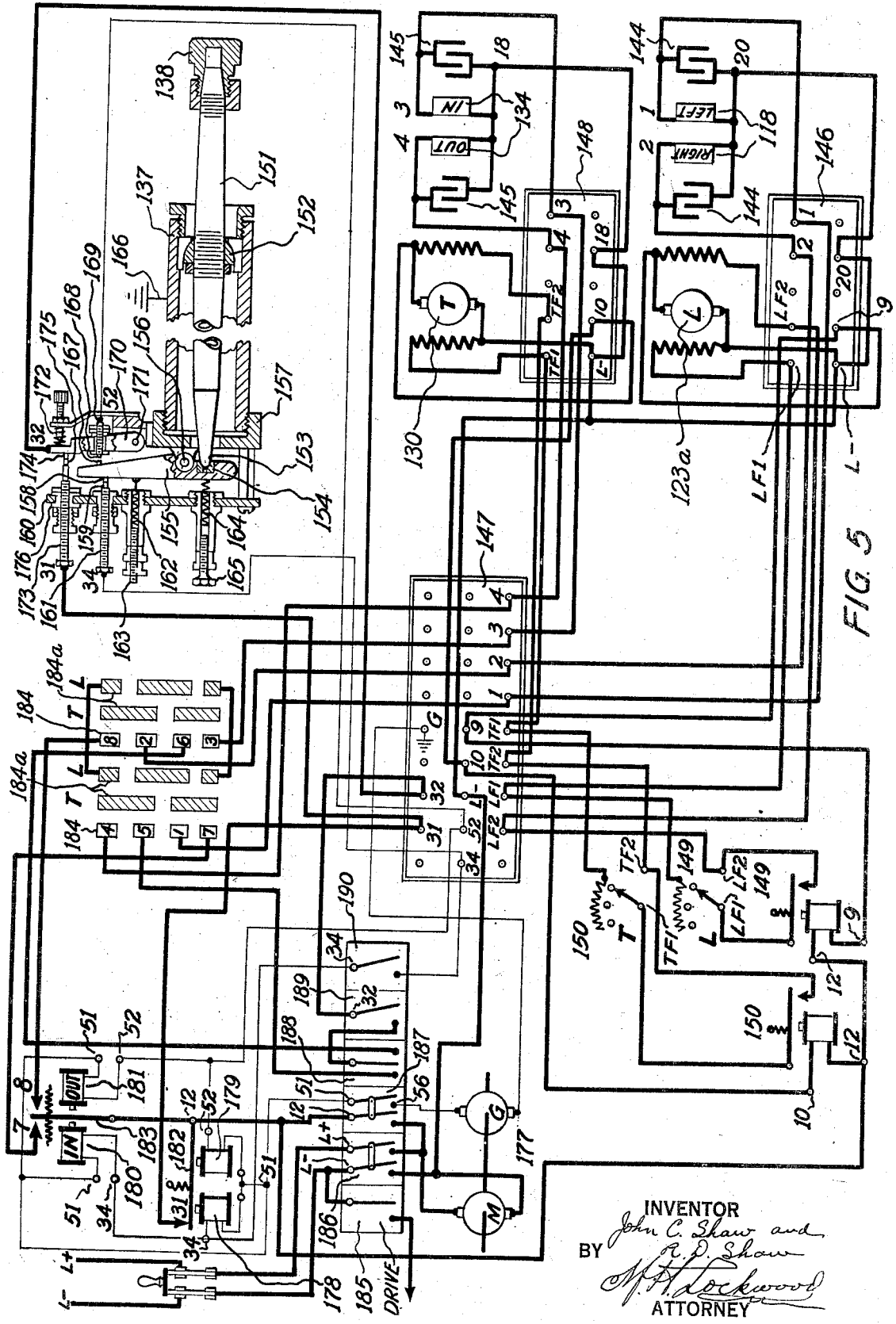

Patented Aug. 5, 1930

1,772,431

UNITED STATES PATENT OFFICE

JOHN C. SHAW AND ROBERT D. SHAW, OF BROOKLYN, NEW YORK, ASSIGNORS TO KELLER MECHANICAL ENGINEERING CORPORATION, OF BROOKLYN, NEW YORK, A CORPORATION OF NEW YORK

ELECTRIC TRACER CONTROL FOR LATHES

Application filed July 25, 1928. Serial No. 295,166.

This improvement relates more particularly to the control of the movements of the lathe cutting tool, relative to the work, such control being particularly important when it is desired to duplicate the work. It is contemplated to employ an electrical tracer, cooperating with a fixed template or pattern, for controlling the toward and from feed of the cutting tool of the lathe, as the tracer follows the pattern; thereby reproducing in the work the outline of the pattern, as the work is turned in the lathe in the usual manner. Since work may be turned in the lathe, either axially, that is longitudinally of the turning axis (spindle turning), or on the faceplate, transversely of the axis, it is the object of this improvement to provide for electric tracer control, according to the pattern, for either longitudinal or transverse operation that is, spindle or face plate turning. In adapting the electric tracer for control of the lathe, certain features shown and described in the patent to John C. Shaw, No. 1,506,454 of August 26, 1924 are employed, and particularly magnetic clutch control and other features described in the patent of John C. Shaw, No. 1,683,581, filed March 4, 1924, for Electrical operation and control of machine tools.

The principal object of the present improvement is to adapt the electric tracer for controlling circuits of relays, which in turn, control the circuits of magnetic clutches for longitudinal and transverse feed of the lathe tool, relative to the work. This magnetic clutch control is primarily through an electric tracer, which in the present instance is provided with a wobbling spindle, having universal lateral movement in a plane parallel to the direction of movement of the lathe feeds, so as to adapt it to follow the edge of a pattern, having the contour it is desired to turn or reproduce in the work. Another object is to provide for mounting the pattern parallel to the longitudinal feed when the main feed is longitudinal for spindle turning and for mounting the pattern transversely when the main feed is transverse for faceplate turning. Since, as previously indicated, work may be turned on the lathe longitudinally, that is, axially or between centers; or transversely, that is across the faceplate, it is essential to provide means for changing the control of the feeds for turning either longitudinally or transversely.

A further object, therefore, is to provide a two position switch and suitable circuit connections for readily shifting the control of the electric tracer from one pair of magnetic clutches to the other, so as to control the toward and from feed of the tool in accordance with the form and position of the pattern, which the electric tracer is adapted to follow. In this manner, it will be understood that by shifting control provision is made for utilizing the same electric tracer for following a pattern when the main feeding movement is either transverse or longitudinal, the only difference being that the cooperating edge of the pattern for longitudinal control will be at right angles to the edge of the pattern when mounted for transverse control. One form and adaptation of the improved electric tracer control for lathes is shown in the accompanying drawings, in which Fig. 1 is a front elevation of a lathe equipped for electric tracer control for axial or spindle turning; Fig. 2 is a broken away transverse sectional view substantially on the line 2—2 of Fig. 1; Fig. 3 is a broken away top plan view of the tool carriage and tracer support, the tracer being shown in cross section; Fig. 4 is a top plan view of the lathe for electric control when the main feed motion is transverse and the turning cut is being made on the face plate; and Fig. 5 is a wiring diagram showing the various circuits, together with a sectional view of the electric tracer.

Referring to the drawings, it will be seen that the lathe comprises the usual bed 101 having the head 102 and tail stock 103 mounted thereon, and adapted for holding the work A between centers 104 when the main feed is longitudinal for turning work axially of the lathe, as indicated in Figs. 1 to 3. The spindle 105 of the lathe may be rotated in any suitable manner, such as by the cone pulleys 106, which may be driven from a motor by a belt in the usual manner. The lathe, as here shown, is provided with a longitudinal lead screw 107 for feeding motion of the longitudinal slide 108, which is mounted on the bed 101 of the lathe in the usual manner for sliding movement on the tracks or ways 109, as shown in Fig. 2. Ordinarily, the lead screw 107 is adapted to be rotated or driven by means of intermediate gears from the lathe spindle 105, but in the present instance, it is desired to control the feed of the screw 107 through magnetic clutches and accordingly, the lead screw 107 is geared through suitable intermediate gears 110, 111 and 112, with a gear 113 mounted on a shaft 114, extending into a clutch gear box 115, as will be seen at the left in Fig. 1. The gear 113 meshes with a pinion 116 secured to clutch armatures 117, which are adapted to cooperate respectively with two clutch magnets 118, provided with bevel gears 119, engaging a bevel pinion 120, so that when the latter is rotated, the magnetic clutches 118 are rotated in opposite directions. The magnetic clutches preferably may be rotated by an electric motor as indicated in Fig. 5, but in Fig. 1 the bevel pinion 120 is connected by bevel gears 121 and 122 with a shaft 123, secured to or formed as part of the spindle 105, so as to be rotated therewith by means of the belt pulleys 106. The magnetic clutch feed control is substantially the same as described in the Shaw specification, hereinbefore referred to, and it will be understood that by energizing one or the other of the magnetic clutches 118, the corresponding armature 117 will be attracted and clutched, so as to rotate the train of gears 113, 112, 111, 110 and hence the lead screw 107 for longitudinal feed motion of the slide 108, either to the right or to the left. The lathe tool 124 is mounted upon the cross feed slide 125 for movement transversely of the axis of rotation and the transverse feed is effected by a lead screw 126 provided with the usual handle 127. The cross feed or transverse slide 125 is mounted on the longitudinal slide 108 in the usual manner, for movement of the lathe tool 124 toward and from the axis of the lathe; but, in the present instance, a magnetic clutch gear mechanism, preferably including a motor drive, is mounted in a casing 128 and secured to the longitudinal slide 108, as indicated in Fig. 1. The clutch drive is preferably effected through a shaft 129, which is shown in Fig. 4 as geared to the transverse or cross feed screw 126, by bevel gears 129ª, so that the cross feed screw may be rotated by means of the motor 130, for in and out feed of the lathe tool. The motor 130, by suitable intermediate gears 131 and 132 and bevel gear connections 133, substantially the same as those described for the magnetic clutches 118, is adapted to rotate a pair of magnetic clutches 134, the armature of which is adapted to rotate the shaft 129, geared to the transverse or cross feed screw 126. By this construction, it will be seen that the motor and clutch drive for the transverse feed motion is entirely supported upon the longitudinally movable carriage 108, and is, therefore, in position to control transverse feed of the lathe tool in any position of the longitudinal carriage. Mounted upon a rear extension of the transverse slide 125, is an overhanging bracket 135 extending rearward and provided with a bearing 136, in which the electric tracer 137 is mounted. The tracer is provided with a tracer point 138, adapted to cooperate with the edge of a pattern 139, mounted upon a horizontally disposed shelf 140, formed on a bracket 141, secured by bolts 142 to the rear wall of the lathe bed 101, as will be seen in Fig. 2. The heads of the bolts 142 are preferably mounted in a T-slot 143 extending longitudinally of the bed, so that the position of the shelf 140, supporting the pattern, may be shifted to bring it into proper cooperative relation with the tracer point 138.

As shown in Figs. 1, 2 and 3, the lathe is adapted for axial turning with the main motion longitudinal and electric tracer control of the in and out movement of the lathe tool 124, transversely, according to the shape of the edge of the pattern 139, as shown in Fig. 3. When, however, it is required to perform the turning operation on the face plate or with the main feed transversely of the axis, the arrangement will be substantially as shown in Fig. 4. Here, it will be seen that the controlling or main motion is the transverse motion under the feed of the screw 126, while motion toward and from the work is effected by the right and left motion of the longitudinal slide 108, under the control of the tracer point 138 following a pattern 139ª (Fig. 4), having its cooperating edge at right angles to the position shown in Fig. 3.

Referring more particularly to the wiring diagram in Fig. 5, it will be seen that the magnetic clutches 118 for longitudinal movement to the right or left of the main slide 108 are represented diagrammatically in the lower right hand corner and marked "Right" and "Left". The motor 123ª marked L, indicates the motor for rotating the magnetic clutches 118 and corresponds to or is a substitute for the spindle shaft 123, as shown in Fig. 1. Likewise, the magnetic clutches 134 for operating the transverse or cross feed screw 126 are shown diagrammatically and marked "Out" and "In". The motor 130 for operating the magnetic clutches 134 is shown at the left of the clutches and marked T. In practice a higher potential current is used for energizing the magnetic clutches and since the circuits are rapidly opened and closed under tracer control, condensers 144 and 145 are preferably placed across the terminals of the respective circuits of the magnetic clutches 118 and 134, as will be seen in Fig. 5. The wiring connections for the magnetic clutches 118, and the motor (L) 123ª operating the latter, are shown as brought to a small terminal board 146, from which various connecting circuits are carried to a larger terminal board 147, and from the latter the circuits branch out to the tracer and various switches and control instruments as hereinafter described. Similarly, the wiring connections of the magnetic clutches 134 and their motor 130 are brought to a small terminal board 148, from which leads are carried to the terminal board 147, as will be seen in Fig. 5. The motor field rheostats and relays are indicated at 149 and 150, but these, being of well known construction and arrangement, need not be described. The field rheostat 149 marked L, controls the motor 123ª and the one 150 marked T controls the motor 130, and since the terminals and connections are correspondingly marked with reference characters, they can readily be traced on the wiring diagram Fig. 5. Any suitable electric tracer, having universal movement in a plane parallel to the directions of movement of the transverse and longitudinal feeds, may be employed, but satisfactory results have been obtained with the electric tracer 137, shown in section in connection with the wiring diagram of Fig. 5, from which it will be seen that the tracer point 138 is mounted on a spindle 151, supported in the cylindrical tracer body 137 by a ball and socket bearing 152 permitting universal wobbling movement of the tracer point 138 in a plane at right angle to the axis of the spindle 151. The opposite end 153 of the spindle is shown as ballnosed and adapted to cooperate with a cone socket 154 in the lower end of a contact carrying lever 155, which is pivoted at 156 to a cap 157 mounted on the end of the tracer body 137. The contact carrying lever 155 is provided with a contact 158, cooperating with a fixed contact 159, mounted in a supporting plate 160 spaced from and secured to the tracer head 157, as indicated in Fig. 5. The contact 159 is mounted upon the end of an adjusting screw 161 and a spring 162 is connected with the lever 155 for holding the contacts 158 and 159 in closed relation, the spring being adjustable as indicated by the screw 163. Cooperating with the spring 162, for holding the front contacts closed, is a compression spring 164 provided with an adjusting screw 165, the spring 164 preferably thrusting against the lower end of the lever 155, substantially opposite the end 153 of the tracer spindle. The front contacts 158 and 159 are adapted to complete the main control circuit 34 for controlling "in" or "toward" feed as hereinafter described. The circuit through the contact lever 155 is completed by grounding the tracer body 137 through the machine, as indicated at 166.

In order to provide for "out" or "from" feed, that is, movement of the tool away from the work, the contact carrying lever 155 is provided with a back contact 167, adapted to cooperate with a contact 168 on the end of an adjusting screw 169. The contact 168 is normally in a relatively fixed position, but is mounted in and insulated from an auxiliary lever 170, pivoted at 171, in an extension of the tracer head 157. The contacts 167 and 168 control the circuit 52, as will be seen by the diagram, Fig. 5, which is adapted to be brought into operation for "out" or "from" feed, when the contacts are closed by sufficient pressure on the tracer point 138, such as will move the contact carrying lever 155 far enough to close the back contacts. An adjustable spring 172 cooperates with the upper end of the auxiliary lever 170, to hold it and contact 168 in normal position, which is determined by an adjusting screw 173. The upper end of the auxiliary lever 170 is provided with a contact 174, cooperating with a contact 175 on the end of the adjusting screw 173. The screw 173 passes through an insulating plug 176, in the plate 160, as will be seen in Fig. 5. The contacts 174 and 175 control the main line high potential circuit (31—32) through the magnetic clutches, so that in case of further excessive pressure on the contact lever 155, after the back contacts 167 and 168 are closed, the auxiliary lever 170 will be forced back against the action of the spring 172, to thereby separate the contacts 174—175 and break the circuit of the higher potential current operating the magnetic clutches. The circuit 31—32 through the contacts 174 and 175 can readily be traced on the wiring diagram back to the main line leads. In order to avoid burning the contacts and to permit closer adjustment, the tracer control circuits 34 and 52 through the contact carrying lever 155 are preferably of relatively low potential, that is, about 10–14 volts, and may be provided by a motor generator 177, indicated diagrammatically at the lower left central portion of the wiring diagram of Fig. 5. This low potential circuit 34 may be traced to the magnet 178 of the table stop relay, the other magnet 179 of which is adapted to be energized from the back contact circuit 52. The low potential circuit 34 continues to the magnet 180, of the double pole relay, which is adapted to control "in" or "toward" feed. The other magnet 181 of the relay is adapted to be operated on the back contact circuit 52 for "out" or "from" feed, at which time it will be seen that the table stop relay magnet 179 is also operated. From the wiring diagram, it will be seen that the main line circuit L+, by means of suitable switches is connected with the higher potential circuit 12 (normally 110-120 volts), which is connected with and passes through the table stop armature 182, forming the higher potential magnetic clutch circuit 31 to the contacts 174, 175, the circuit through the contacts being completed through the lead 32, as can readily be traced from the wiring diagram. This higher potential circuit 32, as previously stated, is utilized for energizing the magnetic clutches through circuits 1, 2, 3 and 4, as hereinafter pointed out. The main line higher potential circuit 12 also connects with the "in" and "out" relay armature 183, which is adapted to close circuit 7, for "in" or "toward" feed and circuit 8 for "out" or "from" feed. The circuits 7 and 8 for energizing the magnetic clutches can be traced through the bars and contacts (184—184ª) of a two position drum switch for connecting with circuits 1, 2 and 3 and 4, according to the position of the drum switch. The drum switch is provided with a plurality of contact fingers 184, located in two rows, as indicated diagrammatically in the upper central part of Fig. 5, one row bearing the circuit designations 4—5—1—7 and the other 8—2—6—3. Two sets of circuit closing bars 184ª, designated respectively T and L, are provided for closing the respective circuits through the contact fingers 184, according to whether the main control feed is to be longitudinal (L) or transverse (T).

It will be understood that when the main control feed is longitudinal, the longitudinal slide 108, under the control of the magnetic clutches 118, is adapted for but one direction of movement, that is, either to the right or to the left, this movement being effected when turning an object mounted axially between the head and tail stocks, as indicated in Fig. 1. In axial or spindle turning the transverse movement of the cross feed slide 125 is tracer controlled "in" or "out", as the tracer point 138 follows the edge of the pattern 139, as indicated in Fig. 3. When longitudinal feed control is desired, the drum switch will be moved so that contact bars designated L will close the respective circuits through the two rows of contact fingers 184. When the main feed control is to be transverse and the "in" and "out" or toward and from feed longitudinal, as would be required for face plate turning, as indicated in Fig. 4, the drum switch contact bars T are brought into position to close the circuits through the rows of contact fingers 184, and then there will be only one direction of transverse feed, either "in" or "out" and the tracer control for toward and from feed will be operative through the magnetic clutches 118, for movement of the longitudinal slide 108. The various circuits are controlled primarily from push button or other type of switches, which are indicated diagrammatically in Fig. 5 and designated 185, 186, 187, 188, 189 and 190 respectively. The switch 185 simply closes the lathe drive, while switch 186 closes the circuit of the main line leads L— and L+ of the higher potential circuit for operating the motor of the motor generator 177 and the motors 123ª and 130 for driving the respective magnetic clutches 118 and 134, which are adapted to be energized by the main line higher potential current as hereinbefore pointed out. The switch 187 closes the high potential circuit 12 and the lower potential circuit 56 from the motor generator 177 to the circuit 51. The latter, it will be seen from the diagram, is the low potential circuit leading to the terminals of the magnets 178 and 179 of the table stop relay and to magnets 180 and 181 of the tracer control relay. The other circuits 34 and 52 to these magnets have been previously referred to. Switch 188 is utilized for closing circuits 5 or 6 for carrying the higher potential current through the drum switch and then to the respective magnetic clutches for axial or faceplate turning, according to the position of the drum switch bars 184ª. Switch 189 is utilized merely for closing the circuit 32, which is the higher potential circuit to the contacts 174—175, the circuit being completed through switch 188, as will be seen from the diagram. Switch 190, as will be seen, carries only the switch for closing the low potential circuit 34 which can be traced through the contacts 158—159 of the contact lever 155 and through the ground 166, the other ground of the low potential circuit being indicated at G on the terminal board 147, the terminal G being connected with one side of the motor generator 177.

For operating the improved electric tracer control for lathes, the proper switches 185 to 190 are closed, and the motor 123ª and 130, driving the respective magnetic clutches 118 and 134, are started. If the turning operation is to be axial, that is, to duplicate from a pattern, an object or piece of work mounted axially of the lathe, as shown in Figs. 1 to 3, the main feed or control will be longitudinal, while the toward and from feed will operate the cross slide to move the tool "in" and "out" under the control of the tracer 137, the tracer point 138 of which will follow the edge of the pattern 139, as more particularly shown in Fig. 3. For this longitudinal operation the two lines of drum switch bars 184ª, marked L, are brought into engagement with the two rows of contact fingers 184. In this (L) position of the drum switch, as will be seen by tracing the circuits in Fig. 5, the tracer control through the front contacts 158 and 159 is effective on the "in" magnetic clutch 134 for transverse feed, while the main feed is longitudinal, to the right or left, according to whether the circuit 5 or 6 is placed in operation by the switch 188. Normally the front contacts 158—159 are closed and magnets 178 and 180 are energized, thus breaking circuit 31 at the armature 182 and closing circuit 7, but when the tracer point 138 engages the pattern 139, (Fig. 3) the universal mounting of the tracer spindle 151 will permit the rear end 153 thereof to move the contact lever 155 to break the contacts 158—159. When the front contacts (158—159) are broken, the main or longitudinal feed by the magnetic clutches 118 will be effected, because the armature 182 is released and permitted to close the circuit 31. When, during longitudinal motion of slide 108, the tracer point engages a rising portion of the pattern, the contact carrying lever 155 will be moved further back until the contacts 167 and 168 are closed, thereby completing the control circuit 52 for the "out" relay magnet 181, which will close circuit 8 to the magnetic clutch 134, for withdrawing the tool from the work to conform to the shape of the pattern. As soon as contacts 167 and 168 are closed relay magnets 179 and 181 will be energized through connections 52 and armature 183 will close the circuit of the "out" magnetic clutch 134 and attraction of armature 182 will lock out the longitudinal motion. In other words, only one of the three motions (in, out and longitudinal) can be working at a time, and the longitudinal motion can operate or come into effect only when contact lever 155 is in neutral position with both contacts 158—159 and 167—168 open. If for any reason relay magnet 179 and armature 182 should be out of order or not work fast enough, then the longitudinal motion would be stopped by breaking the magnetic clutch circuit by opening contact 174—175. In either case longitudinal motion will be stopped while the "out" motion will continue until the pressure is relieved and then the previous relation will be automatically restored and the operation continue as before. For face plate turning, as indicated in Fig. 4, the transverse feed becomes the main feed and the tracer control is through the magnetic clutches 118 for the longitudinal slide 108, which will give longitudinal toward and from feed of the tool. For transverse operation, the drum switch bars 184ª, marked T, are brought into engagement with the two rows of contact fingers 184, and from Fig. 5, it will be seen that tracer control is then effective on the magnetic clutches 118, while transverse feed will be in but one direction, in or out, under the operation of the appropriate magnetic clutch 134, according to which side of switch 188 is closed. As with longitudinal operation, it will be seen that while the contacts 158 and 159 remain closed, (energizing "in" magnet 180) the motion of the tool will be to the left or toward the work, by action of the "left" magnetic clutch 118 on the longitudinal slide 108. As long as contacts 158—159 remain closed the table stop magnet 178 will hold the armature 182 in position to open the circuit 31, thus preventing transverse feed. As soon, however, as the tracer point 138 engages the pattern, which is now at right angles to the position it occupies in Fig. 3 (see Fig. 4) the contacts 158 and 159 will be broken, thereby permitting the opening of circuits 7 of the relay 180—181, and the closing through armature 182 of circuit 31, the latter being adapted then to effect transverse feed. The transverse feed will continue until a rise in the pattern is encountered by the tracer point 138, when, as previously indicated, the contact lever 155 is forced back far enough to close the contacts 167 and 168, to establish the reverse or "from" feed. The operation will continue substantially as previously described for longitudinal control until the work has been completed.

It will be understood that the improvement as described, embodies the preferred form and arrangement for the electric tracer control of lathes, but obviously, it is not limited to the construction shown for various modifications in the arrangement of the circuits and in the provision of safety devices or controls, as well as in its adaptation to various types of machines may be made without departing from the spirit and scope of the invention.

We claim:—

1. The electric tracer control for lathes, comprising a pair of oppositely rotating magnetic clutches for right or left feed of the longitudinal slide, a pair of oppositely rotating magnetic clutches for in and out feed of the transverse slide, an electric tracer mounted for movement with said slides, a support upon which a relatively fixed pattern is mounted for cooperation with said tracer for faceplate and spindle turning, relays controlled by said tracer for opening and closing the circuits of said magnetic clutches for the respective transverse and longitudinal feeds, electrical circuits and switches for said relays and magnetic clutches so arranged that when the main feed is transverse the longitudinal feed is under tracer control for toward and from feed and vice versa, and means for predetermining the respective feeds for spindle or faceplate turning.

2. The electric tracer control for lathes as claimed in claim 1, wherein a multiple switch is provided for changing the electrical connections between the contacts of said relays and the respective magnetic clutches for predetermining tracer control of the feeds for spindle or faceplate turning.

3. The electric tracer control for lathes, as claimed in claim 1, wherein a motor generator is provided for supplying relatively low potential current for the circuits controlled by the tracer for operating said relays to close higher potential circuits to the respective magnetic clutches.

4. The electric tracer control for lathes, as claimed in claim 1, wherein current of normal line voltage is used for energizing said magnetic clutches and condensers are connected across the terminals thereof.

5. The electric tracer control for lathes, comprising a pair of magnetic clutches rotatable in opposite directions for right and left longitudinal feed, a pair of oppositely rotating magnetic clutches for in and out transverse feed, an electric tracer movable by said feeds for cooperation with a relatively fixed pattern for controlling the circuits of said magnetic clutches, means for supporting the pattern for face plate and for axial turning and means for determining the circuits for controlling the respective magnetic clutches.

6. The electrical tracer control for lathes, comprising a longitudinal slide, a pair of oppositely rotating magnetic clutches for moving said slide to the right or left, a transverse slide, a pair of oppositely rotating magnetic clutches for moving said transverse slide in or out, an electric tracer mounted upon said transverse slide the tracer point of which is adapted for universal movement in a plane parallel to the directions of motion of said slides, a pattern mounted in relatively fixed position for cooperation with said tracer point, said pattern being adapted to be mounted in one position for axial turning and in another position at right angles to the first position for face plate turning, and means for mounting said pattern in a plane parallel to the directions of motion of said slides.

7. The electric tracer control for lathes as claimed in claim 6, wherein movements of said tracer point are adapted to control circuits of relays, the armatures of which control circuits to the respective magnetic clutches.

8. The electric tracer control for lathes as claimed in claim 6, wherein said universally movable tracer point is adapted to control electric circuits for said magnetic clutches, and a two position switch is provided for establishing said circuits for controlling movement of the slides when said pattern is in position for face plate turning and for axial turning respectively.

9. The electric tracer control for lathes, as claimed in claim 6, wherein said universally movable tracer point is adapted to control relays operating on relatively low potential current, for closing higher potential circuits energizing said magnetic clutches and manually operable switches are provided for closing low potential circuit between the tracer and relays and higher potential circuits to said magnetic clutches, the latter passing through a two position multiple switch for effecting in and out control of one pair of said magnetic clutches from the tracer spindle when the pattern is in one position and of the other pair of magnetic clutches when the pattern is in another position.

10. The electric tracer control for lathes, comprising a longitudinal slide, means for moving said slide parallel to the axis of the lathe, a pair of magnetic clutches cooperating with said last named means for moving the longitudinal slide to the right or left, a transverse slide supported on the longitudinal slide for motion at right angles to the axis of the lathe, means for moving the transverse slide, a pair of magnetic clutches co-operating with the last named means for moving the transverse slide in or out, a tracer spindle mounted on said transverse slide for universal movement in a plane parallel to the directions of motion of said slides, means for supporting a pattern in relatively fixed position for cooperation with the tracer end of said spindle, the pattern being adapted to be mounted in one position for axial turning and in another position at right angles to the first position for face plate turning, electrical circuits adapted to be opened and closed by movement of said tracer spindle for effecting energization of the respective magnetic clutches to control motion of said slides, relays in said circuits for breaking the circuit for energizing one pair of clutches when the circuit for the other pair is closed and a two position switch providing for one arrangement of circuits when the pattern is in position for axial turning and another arrangement when the pattern is in position for face plate turning.

11. An electric tracer control for lathes, comprising a support upon which the pattern is mounted for spindle and faceplate turning, a pair of magnetic clutches for effecting right and left longitudinal feed, a pair of magnetic clutches for effecting in and out transverse feed, a relay for controlling the respective magnetic clutches for feed toward and from the pattern for both spindle and faceplate turning, a table stop relay for controlling the main feed at right angles to the toward and from feed in both spindle and faceplate turning, an electric tracer operating the respective relays for controlling the toward and from feed and the main feed for both spindle and face-plate turning in such manner that only one of the feeds, toward or from or main, is in operation at a time.

12. The electric tracer control for lathes, as in claim 11, wherein circuits and switches are provided for operating said relays from the electric tracer contacts and the respective magnetic clutches from the relays.

13. The electric tracer control for lathes as in claim 11, wherein the electric circuits of both pairs of magnetic clutches are connected with terminals in a drum switch and contact bars therein are adapted for completing magnetic clutch circuits through the respective terminals for either spindle or faceplate turning, thereby predetermining longitudinal or transverse main feed and the toward and from feed which in either case is controlled by tracer contacts.

14. The electric tracer control for lathes as in claim 11, wherein the relay for toward and from feed is adapted to close magnetic clutch circuits for such feed by the closing of tracer contacts and the table stop relay for closing circuits for the main feed is adapted to be operated when said tracer contacts are open, and a two position drum switch in circuit with said magnetic clutches may place one or the other of said pairs of magnetic clutches in circuit with the table stop relay and thus predetermine spindle or faceplate turning and the corresponding toward and from movement.

JOHN C. SHAW.
ROBERT D. SHAW.